(12) United States Patent
Jennes et al.

(10) Patent No.: US 8,491,271 B2
(45) Date of Patent: Jul. 23, 2013

(54) EXHAUST GAS TURBO-CHARGER

(75) Inventors: Joerg Jennes, Stuttgart (DE);
Thanh-Hung Nguyen-Schaefer, Asperg (DE); Stefan Muenz, Ludwigshafen (DE)

(73) Assignee: Bosch Mahle Turbo Systems GmbH Co. KG (DE)

( * ) Notice: Subject to any disclaimer, the term of this patent is extended or adjusted under 35 U.S.C. 154(b) by 619 days.

(21) Appl. No.: 12/541,659

(22) Filed: Aug. 14, 2009

(65) Prior Publication Data
US 2010/0050633 A1   Mar. 4, 2010

(30) Foreign Application Priority Data

Aug. 16, 2008  (DE) .................. 10 2008 038 007

(51) Int. Cl.
*F01D 5/34* (2006.01)
(52) U.S. Cl.
USPC .............. 416/244 A; 415/216.1; 416/213 R
(58) Field of Classification Search
USPC ............. 415/216.1; 416/204 A, 213 R, 244 A
See application file for complete search history.

(56) References Cited

U.S. PATENT DOCUMENTS

| | | | | |
|---|---|---|---|---|
| 4,557,704 A | * | 12/1985 | Ito et al. | 464/181 |
| 4,639,194 A | * | 1/1987 | Bell et al. | 416/241 B |
| 4,942,999 A | * | 7/1990 | Oda et al. | 228/124.7 |
| 6,848,180 B2 | * | 2/2005 | Shimizu | 29/889.2 |
| 2007/0113552 A1 | | 5/2007 | Fremerey et al. | |
| 2009/0050675 A1 | | 2/2009 | Baur et al. | |
| 2010/0003132 A1 | * | 1/2010 | Holzschuh | 415/230 |

FOREIGN PATENT DOCUMENTS

| | | | |
|---|---|---|---|
| DE | 294048 A | * | 9/1991 |
| DE | 102005007404 | * | 3/2005 |
| DE | 102004025049 | | 12/2005 |
| DE | 102005015947 | | 7/2006 |
| EP | 0513646 | | 11/1992 |
| EP | 1002935 | | 5/2000 |
| WO | WO-98/45081 | | 10/1998 |
| WO | WO-2008/071253 | | 6/2008 |

OTHER PUBLICATIONS

German Search Report.
English Abstract for EP-0513646.
English abstract for EP-1002935.

* cited by examiner

*Primary Examiner* — Edward Look
*Assistant Examiner* — Liam McDowell
(74) *Attorney, Agent, or Firm* — Rader, Fishman & Grauer PLLC

(57) ABSTRACT

In an exhaust-gas turbocharger with a shaft axially arranged between a compressor wheel and a turbine wheel and connected in a rotationally fixed manner to the compressor wheel as well as to the turbine wheel, said shaft being rotationally mounted with a turbine-side shaft part in a turbine-side bearing, a connecting region with minimal heat conductivity is axially arranged or configured between the turbine-side shaft part and the turbine wheel in such a manner that the heat flow emanating from the turbine wheel is choked.

20 Claims, 1 Drawing Sheet

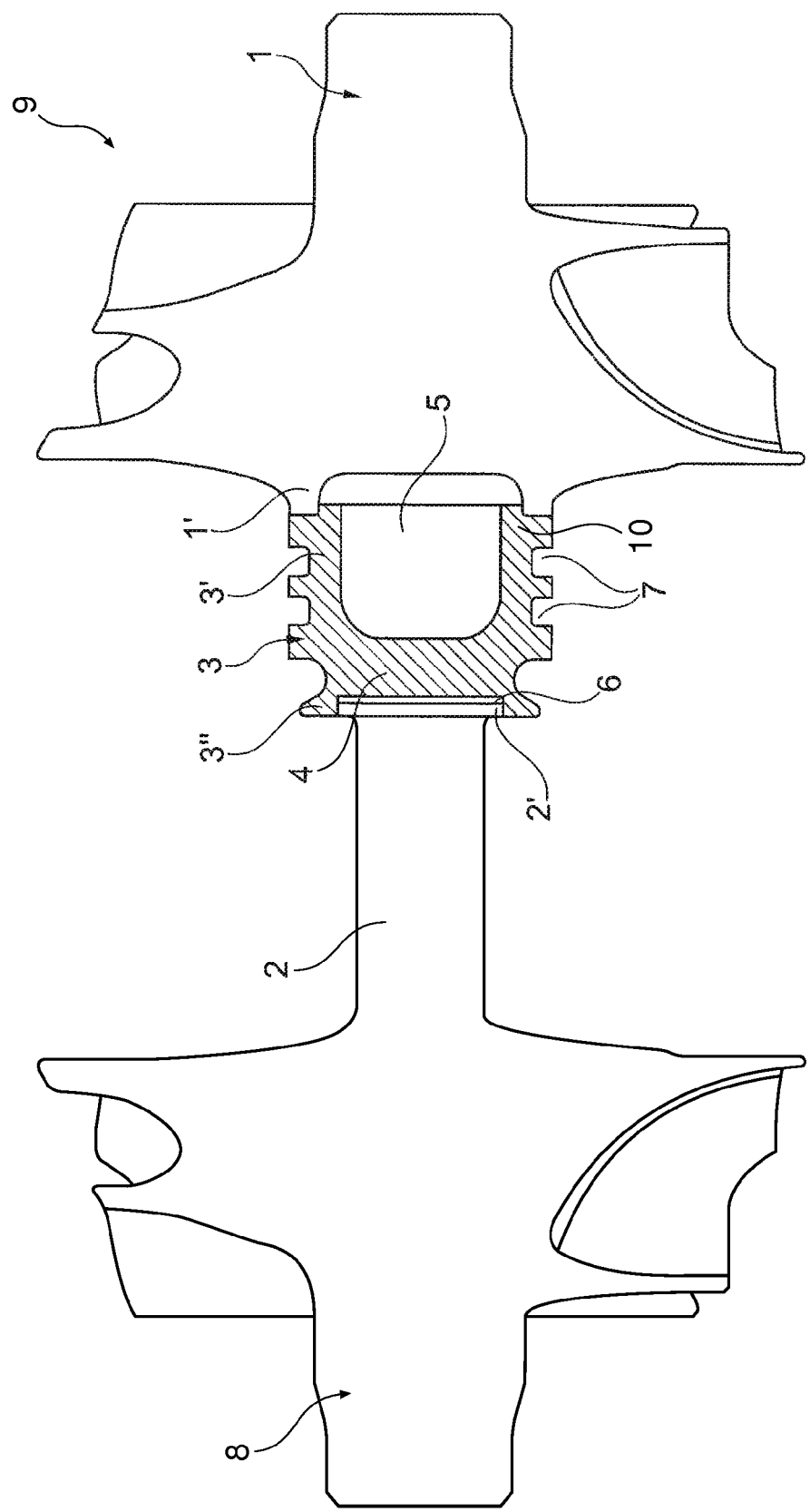

EXHAUST GAS TURBO-CHARGER

CROSS-REFERENCE TO RELATED APPLICATIONS

This application claims priority to German Patent Application 10 2008 038 007.5 filed on Aug. 16, 2008, which is hereby incorporated by reference in its entirety.

TECHNICAL FIELD

The invention relates to an exhaust-gas turbocharger according to the preamble of claim 1.

BACKGROUND

Exhaust-gas turbochargers are widely used in series motor vehicles in order to increase the performance of the respective vehicle engines. It is advantageous that the engines can be configured with small cubic capacity and comparably small measurements so that the internal friction in the engine remains minimal and favourable degrees of efficiency can be achieved already on this basis alone.

According to the conventional manner of construction today, the exhaust-gas turbochargers have a rotor with a compressor wheel and a turbine wheel and a shaft arranged between said compressor wheel and turbine wheel, said shaft being rotatably mounted on the turbine side and on the compressor side with corresponding rotor bearings. The rotor bearings are customarily slide bearings with oil lubrication, the housing of the bearing on the turbine side being sealed on the side opposite the turbine wheel by means of piston rings that are arranged in corresponding piston ring grooves on the shaft or on a shaft part. By means of the preferably doubly arranged piston rings, an escape of the lubricating oil from the bearing housing in the direction of the turbine wheel is intended to be prevented.

This is important because the turbine wheel attains high temperatures during the operation of the exhaust-gas turbocharger and the lubricating oil possibly escaping in the direction of the turbine wheel can change into coke owing to the high temperatures.

Document EP 1 002 935 A1 shows the features of the preamble of claim 1. The intermediate piece is configured from many different views, two layers being designed as cylindrical sections, so that the cross-section available there for heat transfer is correspondingly reduced.

Document DE 10 2004 025 049 A1 shows a turbocharger the turbine wheel of which is connected in a rotationally fixed manner to the compressor wheel by means of a shaft, a heat-conducting throttle, which is characterised as "heat insulating", being available in the shaft between a shaft part that is on the turbine wheel side and a shaft part that is on the compressor wheel side.

Document WO 2008/071253 A1 relates to a special manner of constructing the rotor of a turbocharger. In a basically known manner, the rotor has a shaft axially arranged between a compressor wheel and a turbine wheel, said shaft connecting the two wheels to one another in a rotationally fixed manner. The turbine wheel is arranged on a connection pin continuing the shaft on the turbine wheel side, the connection plane of the shaft and the connection pin being axially distanced from the compressor-side front face of the turbine wheel. This is intended to ensure that there is sufficient space present on the connection pin for piston ring grooves and that they can be arranged inside the material provided for the turbine wheel that has an increased heat resistance in comparison to the shaft.

Document EP 0 513 646 B1 discloses a method for connecting steel parts to aluminium- or titanium-alloy parts. This method is particularly suited for connecting the compressor wheel of a turbocharger to the rotor wheel. In this manner, it is possible to connect a compressor wheel composed of aluminium- or titanium-alloy parts to the rotor wheel that is manufactured of steel in the light of the thermal stress created by the turbine wheel. According to document EP 0 513 646 B1, it is provided for the connecting of parts composed of steel with such parts manufactured of aluminium-alloy, that a pure nickel layer be applied to the steel by means of friction welding and to connect the worked surface with the aluminium alloy by means of friction welding. In order to connect parts composed of steel with such parts manufactured of titanium alloy, it is analogously provided that a copper layer be applied on the steel by means of friction welding and that a vanadium layer be applied to the titanium alloy by means of friction welding, and connected the worked copper and vanadium surfaces by means of friction welding. As a result, highly stresses machine elements composed of very different materials can be welded together.

Document WO 2008/071253 shows a connection between turbine wheel and rotor wheel, a substantially tubular connection pin being arranged or integrally formed on the front face, which is opposite the rotor shaft, of the turbine wheel, said connection pin having in comparison to the exterior diameter of the RS a large exterior diameter and being connected on it axial end that is on the shaft side to an annular step of a connection part that is arranged or integrally formed on the RS, a hollow space remaining on the interior of the tubular connection pin the axial length of which corresponding to approximately the axial length of an external circumferential zone provided on the external circumference of the connection pin for two adjacent piston ring grooves.

In this manner, a high degree of stability is intended to be ensured in the transition zone between RS and turbine wheel in the region of the piston ring grooves.

Document DE 10 2005 015 947 B3 relates to a friction welding process for the rotor of a turbocharger, with which components composed of steel and metal aluminide can be connected. In the instance of a rotor of a turbocharger, the turbine wheel can then consist of a metal aluminide and be connected to a RS consisting of steel.

A fundamentally similar method is the subject matter of document WO 98/45081. Here, a turbine wheel composed of a titanium aluminide is intended to be connected to a RS of a turbocharger, which RS is composed of steel. In order to make this possible in terms of welding technology, a multi-layer intermediate body is axially inserted between the RS and the turbine wheel.

SUMMARY

The problem addressed by the invention is now to create an exhaust-gas turbocharger the turbine wheel of which may be subjected to high temperatures upon the charging operating without risking harm to adjacent elements, thereby making accordingly possible a high-degree of operational efficiency of the combination formed from internal combustion engine and exhaust-gas turbocharger.

This problem is solved according to the invention with an exhaust-gas turbocharger of the previously mentioned type through the features described herein.

The invention is based on the general concept of permitting an effectively choked heat transfer only between the rotor bearing on the turbine side and the turbine wheel.

For this purpose is provided, first, the production of a connection region between a shaft part on the turbine side and the turbine wheel composed of a material with (comparably) lower heat conductivity and, second, the configuration of the connection region in such a manner that only minimal cross-sections are present for the heat flow from the turbine wheel to the shaft part that is on the turbine side. If, according to a preferred embodiment of the invention, it is simultaneously ensured that the shaft part, which is arranged in the rotor bearing that is on the turbine side, is connected, in a manner favourable to heat conducting, to the compressor wheel, which has comparably low temperatures during operation, or with a shaft part that is on the compressor side, comparably low temperatures can be realised in the region of the rotor bearing on the turbine side in such a manner that there is no risk of the lubricating oil in the rotor bearing on the turbine side turning into coke.

In order to limit the possible heat flow in the connection region by small cross-sections of the material conducting the heat, the connection region in the invention is formed by a connecting piece that has a tubular flange on the turbine-wheel side, said flange enclosing an axial hollow space that remains between a front face, which is directed opposite thereto, of the turbine wheel and a floor of the connecting piece, and said connecting piece being furthermore welded to the turbine wheel on an annular zone on the turbine wheel side.

Moreover, it can advantageously be provided that the connecting piece also has a tubular flange on the shaft side, which flange encloses an axial hollow space remaining between the shaft part and the floor of the connecting piece, and furthermore being welded to the shaft part on an annular zone on the shaft side. The substantially tubular connecting piece maintains a particularly high degree of stability by means of the floor between the hollow space on the turbine side and the hollow space on the shaft side. At the same time, comparably thin circumferential walls are made possible.

An alloyed steel, for example X8CrNi, is suitable as a material for the connection region.

It should be added that with regard to preferred features of the invention, reference is made to the claims and to the following explanation of the drawings using the especially preferred embodiment of the invention, which will be explained in greater detail.

Protection is not sought for explicitly specified or shown combinations of features but rather, in principle, for any combination whatsoever of the specified or shown individual features claimed.

BRIEF DESCRIPTION OF THE DRAWINGS

The sole FIGURE shows in the drawing a schematic axial section of the turbine wheel as well as an axially abutting part of the rotor shaft.

DETAILED DESCRIPTION

According to the drawing, a connecting piece 3 is arranged between a turbine wheel 1 and a shaft part 2, which is on the turbine side and is of the rotor shaft that is not more closely shown, said connecting piece being welded, on the one hand, to the turbine wheel 1 and on the other to the shaft part 2. The shaft part 2 is also connected to a compressor wheel 9.

The connecting piece 3 consists of a material with comparably poor heat conductivity in order to limit as far as possible the heat flow from the turbine wheel 1 to the shaft part 2. This heat flow is caused by the fact that the turbine wheel 1, which is impinged upon by exhaust gases of the associated internal combustion engine during operation of the exhaust-gas turbocharger 8, becomes very hot. By limiting the heat flow in that, for example, the connecting piece 3 is effective as a heat flow choke, considerably reduced temperatures can be ensured on the shaft part 2 with regard to the operating temperature of the turbine wheel 1. This is therefore of importance because the region of the shaft part 2 that is in close proximity to the turbine wheel serves as a rotational bearing of the rotor of the exhaust-gas turbocharger 8, oil-lubricated slide bearings being provided as a rule and an undesired turning-into-coke of the lubrication means being able to be avoided only upon sufficiently low temperatures of the shaft part 2.

It is advantageous for the functioning of a heat flow choke if the connecting piece consists of a steel alloy, such as X8CrNi, for example, or a different substance that is poor at conducting heat. Such a material has only a minimal capacity to conduct heat.

Moreover, the heat flow penetrating the connecting piece 3 can additionally be limited in that the connecting piece 3 provides only limited cross sections for the heat flow owing to a corresponding configuration of said connecting piece. In the example shown, the connecting piece 3 has a tubular flange 3' on its side that is opposite the turbine wheel 1, the front edge on the side of the turbine wheel of said flange being designed in the style of an annular step 10 and being connected to an axial annular bar l' on the turbine wheel 1. In this manner, the tubular flange 3' encloses a hollow space 5 that remains between a floor 4 of the connecting piece 3 and the front face opposite thereto of the turbine wheel 1.

The end of the connecting piece 3 that is opposite the shaft part 2 forms an additional tubular flange 3" that comprises the exterior circumference of disc-shaped flange 2' arranged on the turbine wheel-side front end of the shaft part 2, the axial length of the tubular flange 3" being measured in such a manner that a further hollow space 6 remains axially between the floor 4 of the connecting piece 3 and the front face opposite thereto of the disc-shaped flange 2' on the shaft part 2.

In the exterior circumferential surface of the connecting piece 3, two piston ring grooves 7 are arranged in the region of the tubular flange 3', and piston rings can, in theory, be arranged in the piston ring grooves 7 in a known manner in order to seal a (not shown) bearing house in the region of the shaft part 2.

The invention claimed is:

1. An exhaust-gas turbocharger, comprising:
a shaft that is axially arranged between a compressor wheel and a turbine wheel and that is rotationally fixed relative to the compressor and the turbine wheel, wherein the shaft includes a turbine-side end;
a connecting piece having a turbine-wheel side, a shaft side, a first tubular flange, a floor, and a second tubular flange, wherein the connecting piece is an axial intermediate piece having the turbine-wheel side welded to the turbine wheel and the shaft side welded to the turbine-side end of the shaft, such that the connecting piece connects the turbine-side end of the shaft to the turbine wheel and is configured as a heat-conducting choke,
wherein the first tubular flange is on the turbine-wheel side of the connecting piece and encloses an axial hollow space that remains between a front face of the turbine wheel and the floor of the connecting piece, wherein the second tubular flange is on the shaft side of the connecting piece and encloses a further hollow space that remains between the turbine-side end of the shaft and the floor of the connecting piece, and wherein the first tubular flange of the connecting piece is welded to the turbine wheel on an annular zone on the front face of the turbine wheel, and wherein the second tubular flange of the connecting piece is welded to the turbine-side end of the shaft.

2. The exhaust-gas turbocharger as specified in claim 1, wherein the second flange encloses an external circumference of a radial flange formed on the turbine-side end of the shaft, and wherein the connecting piece is welded to the turbine-side end of the shaft on an annular zone on the radial flange.

3. The exhaust-gas turbocharger as specified in claim 2, wherein the first tubular flange has an annular step with an annular exterior circumferential surface axially overlapping with an internal circumferential surface of an annular bar on the turbine wheel and an annular radial surface abutting with a radial annular surface of a radial front face of the annular bar.

4. The exhaust-gas turbocharger as specified in claim 2, wherein the second tubular flange encloses an external circumference of a radial flange arranged on the turbine-side end of the shaft.

5. The exhaust-gas turbocharger as specified in claim 2, wherein the connecting piece is provided on an external circumference with axially adjacent piston ring grooves.

6. The exhaust-gas turbocharger as specified in claim 2, wherein the connecting piece is constructed at least in part of one of a steel alloy, and a material having low heat-conducting properties.

7. The exhaust-gas turbocharger as specified in claim 6, wherein the steel alloy is X8CrNi.

8. The exhaust-gas turbocharger as specified in claim 1, wherein the connecting piece has on the turbine-wheel side an annular step on a front face of the first tubular flange, the annular step having an annular exterior circumferential surface axially overlapping with an internal circumferential surface of an annular bar on the turbine wheel and an annular radial surface abutting with a radial annular surface of a radial front face of the annular bar.

9. The exhaust-gas turbocharger as specified in claim 8, wherein the second tubular flange encloses an external circumference of a radial flange arranged on the turbine-side end of the shaft.

10. The exhaust-gas turbocharger as specified in claim 8, wherein the connecting piece is provided on an external circumference with axially adjacent piston ring grooves.

11. The exhaust-gas turbocharger as specified in claim 8, wherein the connecting piece is constructed at least in part of one of a steel alloy, and a material having low heat-conducting properties.

12. The exhaust-gas turbocharger as specified in claim 11, wherein the steel alloy is X8CrNi.

13. The exhaust-gas turbocharger as specified in claim 1, wherein the second tubular flange comprises encloses an external circumference of a radial flange arranged on the turbine-side end of the shaft.

14. The exhaust-gas turbocharger as specified in claim 13, wherein the connecting piece is provided on an external circumference with axially adjacent piston ring grooves.

15. The exhaust-gas turbocharger as specified in claim 13, wherein the connecting piece is constructed at least in part of one of a steel alloy, and a material having low heat-conducting properties.

16. The exhaust-gas turbocharger as specified in claim 15, wherein the steel alloy is X8CrNi.

17. The exhaust-gas turbocharger as specified in claim 1, wherein the connecting piece is provided on an external circumference with axially adjacent piston ring grooves.

18. The exhaust-gas turbocharger as specified in claim 17, wherein the connecting piece is constructed at least in part of one of a steel alloy, and a material having low heat-conducting properties.

19. The exhaust-gas turbocharger as specified in claim 1, wherein the connecting piece is constructed at least in part of one of a steel alloy, and a material having low heat-conducting properties.

20. The exhaust-gas turbocharger as specified in claim 19, wherein the steel alloy is X8CrNi.

* * * * *